May 26, 1970 D. K. MacDONALD 3,514,629

TWO-CONDUCTOR REMOTE SWITCHING AND TRANSMITTING CONTROL SYSTEM

Filed Jan. 23, 1969

INVENTOR
DONALD K. MacDONALD
BY
ATTORNEY 3,514,629

TWO-CONDUCTOR REMOTE SWITCHING AND TRANSMITTING CONTROL SYSTEM

Donald K. MacDonald, 1203 Belknap Court, Cupertino, Calif. 95014

Filed Jan. 23, 1969, Ser. No. 794,483
Int. Cl. H04g 9/14
U.S. Cl. 307—140 12 Claims

ABSTRACT OF THE DISCLOSURE

Electrical switching power is transmitted from a master station to a slave station over two conductors which are also used to transmit information signals between the master and slave stations. The slave station discriminates between switching and information signals, enabling simultaneous connection of switching and information circuitry to the two conductors.

BACKGROUND OF THE INVENTION

This invention relates broadly to remote switching and transmitting control systems, and more specifically to a system in which switching power is transmitted from a master station to a slave station over two conductors which also transmit information signals between the master and slave stations.

Remote switching control between master and slave stations is often required where distance or environmental restrictions limit access to the slave station. Economy and ease of construction and maintenance of the switching system require that the number of conductors interconnecting the master and slave stations be held to a minimum.

Prior remote switching and indicating systems have reduced the number of interconnecting conductors between stations in a number of ways. Separate switching power inputs to each station have been used to eliminate a power conductor between the master and slave stations. This expedient is impractical where a source of switching power is not available to one or the other of the stations, as in submarine or subterranean environments, for example. Separate power inputs, in fact, by adding an additional input to each system, present the inherent deficiencies of an additional interconnecting conductor.

Systems employing two conductors and a common earth ground, an example of which is found in U.S. Pat. No. 2,321,922, have been employed for remote control of switching and indicating apparatus. Although these systems at first appear to be connected by only two conductors, the common earth ground is, in fact, an additional interconnection. Where complete electrical isolation is required, or where a stable common ground is not available, these systems cannot be used.

Digital pulse coding has been employed in control systems to transmit switching information to a slave station and to receive information simultaneously transmitted by multiple information circuits located at a slave station. The electronic coding circuitry required at each station is costly and complex. As in other prior systems, separate conductors are used for transmitting switching power and for transmitting data signals. The complex decoding apparatus required at the master station for the interpretation of data from the slave station is a further disadvantage of these systems.

SUMMARY OF THE INVENTION

The present invention provides a remote switching and transmitting control system in which both power and information signals are transmitted over two electrical conductors which connect master and slave stations at each end of the control system. The master station includes a source of switching power and a first plurality of electrical circuits, which are shown as electrical meters in the preferred embodiment. The slave switching station includes a slave switching circuit and a second plurality of electrical circuits, which are shown as electrical transducer probes, with their associated controls, in the preferred embodiment. A switching control in the master station alternately connects either an individual electrical meter or the switching power source in series with the two conductor interconnection with the slave station. The switching control is operated to alternately read the information signal transmitted from a transducer in the slave station, or to switch to a different transducer.

In the slave switching circuit, solenoid actuated multilevel stepping switches synchronously advance to a different set of contacts each time the power source is energized in series with the two conductors. A different individual transducer is alternately connected in series with the two conductors through the rotors and contacts of the stepping switches at each new contact position. Alternate levels of the multilevel stepping switches interconnect control circuitry associated with the transducers, as appropriate for operation of the transducers.

An individual transducer probe and the slave switching circuit of the slave station are simultaneously connected to the two conductor interconnection between the master and slave stations. Isolation of the sensitive transducer probes from the switching power pulses is provided by a reverse biased diode by-pass around the transducer circuitry. This diode by-pass forms a discriminating link which enables the simultaneous operative connection of the relatively high energy switching system and the more sensitive low energy transducer probes to the two conductor interconnection. The result is a control system which is simple in design and efficient in operation.

It is therefore an object of the present invention to provide a remote switching and transmitting control system in which switching power and information signals are transmitted between stations over the same two conductors.

It is a further object of this invention to provide a two conductor remote switching and transmitting control system in which a remote slave station is simultaneously activated for information transmission and for remote switching to alternate sources of information.

It is a still further object of this invention to provide a two conductor remote switching and transmitting control system in which a master station provides the source of switching power for a slave switching station.

It is a still further object of this invention to provide a two conductor remote switching and transmitting control system master station for alternately switching between different electrical circuits in a slave station and for connecting the different circuits to corresponding electrical circuits in the master station.

It is a still further object of this invention to provide a two conductor remote switching and transmitting control system incorporating a slave switching and transmitting station which selectively discriminates between switching and information signals.

It is a still further object of this invention to provide a remote switching and transmitting control system incorporating transducer probes and readout devices suitable for study and analysis of remote environments.

These and other objects of the present invention will become more fully apparent with reference to the following specification and drawing which describe the preferred embodiment of the invention.

DESCRIPTION OF THE PREFERRED EMBODIMENT

Figures 1, 2:
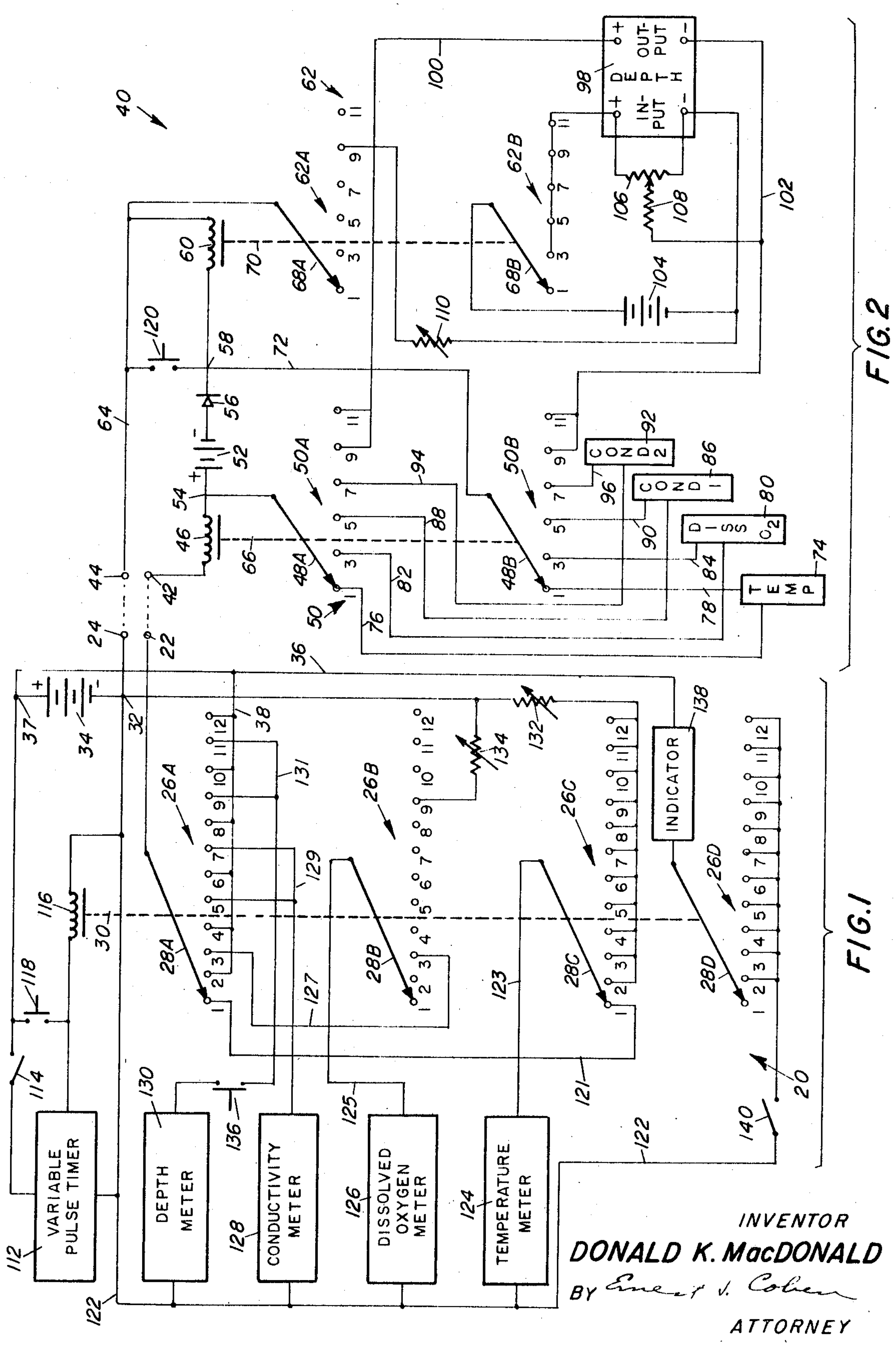
FIG. 1 schematically illustrates the master station of a two conductor remote switching and transmitting control system.
FIG. 2 schematically illustrates the slave station of a two conductor remote switching and transmitting control system.

A control system master station 20, with positive and negative output terminals 22 and 24, respectively, is shown in FIG. 1. Positive output terminal 22 is connected to a conductive rotor 28A of a first level 26A of a four level, continuous rotation, unidirectional, stepping switch 26. Stepping switch 26 is schematically shown in linear configuration for the sake of clarity. A description of the basic operating principle ofswitch 26 is included in my co-pending application Ser. No. 657,555, filed Aug. 1, 1967.

Each level 26A–D of switch 26 has a conductive rotor 28A–D and twelve contact terminals 1–12. The first level 26A has alternate unlatched positions 2–12. In the unlatched positions a sliding engagement of conductive rotor 28A and contact terminals 2–12 occurs as the rotor passes between latched positions 1–11. In the latched positions 1–11 of level 26A a pressure detent between the rotor and terminal contacts occurs. The rotors of switch levels 26A–D are joined for synchronous rotation by a mechanical linkage 30 to provide simultaneous switching of each level onto a similarly numbered contact.

Negative output terminal 24 of master station 20 is connected through a common terminal 32 to the negative output terminal of a battery 34. The positive terminal of battery 34 is connected to a positive lead 36 at a terminal 37. The unlatched even numbered terminals 2–12 of switch level 26A are similarly connected to positive lead 36 via a common lead 38. Since negative output terminal 24 is connected to the negative terminal of battery 34, and since each unlatched terminal of level 26A is connected to the positive battery terminal, a positive voltage switching pulse appears across output terminals 22–24 each time rotor 28A, which is connected to terminal 22, sweeps across an unlatched terminal.

Individual switching pulses from master station 20 are transmitted to a slave station 40 which is joined via two conductors to the positive and negative terminals of the master station at positive and negative input terminals 42 and 44, respectively, as shown in FIG. 2. A stepping switch driving solenoid 46 is connected to positive input terminal 42 at one end, and to conductive rotor 48A on the first level 50A of a two level unidirectional rotary stepping switch 50, again depicted in linear configuration for the sake of clarity. The positive terminal of a battery 52 is joined to a common terminal 54 between stepping solenoid 46 and rotor 48A. The anode of a diode 56 is joined to the negative terminal of battery 52 and the cathode is joined to one end of a stepping switch driving solenoid 60 of a two level unidirectional rotary stepping switch 62 at a terminal 58. The other end of stepping solenoid 60 is joined to negative terminal 44 through a common lead 64.

Battery 52 biases diode 56 in the reverse direction. The voltage of the battery is selected to block forward current flow through diode 56 for voltages on the order of information signals transmitted between the master and slave stations, and to conduct when switching pulses from the master station are received. Stepping solenoids 46 and 60 are selected with a threshold stepping voltage above the information voltage range, and just below the voltage of the switching pulses from the master station. Thus, the circuit path through battery 52 and diode 56 is effectively uninterrupted for switching pulses from the master station and an open circuit for information signals from either station.

Each time rotor 28A of stepping switch 26 contacts an unlatched terminal 2–12 of stepping switch 26 a voltage pulse energizes stepping solenoids 46 and 60 in the slave station. Solenoid 46 steps conductive rotors 48A and 48B of two level rotary stepping switch 50 each time a switching pulse energizes the solenoid. Each level 50A and 50B of stepping switch 50 includes six contact terminals 1–11. Conductive rotors 48A and 48B are joined by a mechanical linkage 66 for uniform synchronous rotation of both rotors between the terminals 1–11 of each level. In a similar manner, conductive rotors 68A and 68B of a two level unidirectional rotary stepping switch 62 are joined by a mechanical linkage 70 for uniform synchronous rotation each time a switching pulse energizes stepping solenoid 60.

As described above, conductive rotor 48A of level 50A is joined to positive terminal 42 through stepping solenoid 46. The conductive rotor 48B of level 50B is joined to terminal 58 between the cathode of diode 56 and stepping solenoid 60 via a conductor 72, and subsequently to negative terminal 44 through stepping solenoid 60.

In terminal position 1 of the conductive rotors of stepping switch 50, a temperature probe 74 is connected in series with the rotors 48A and 48B via conductors 76 and 78 connected to terminal contact 1 of each level of the switch. In terminal position 3 a dissolved oxygen probe 80 is connected in series with the rotors via conductors 82 and 84. In terminal position 5 a first conductivity probe 86 is connected in series with the rotors via conductors 88 and 90, and in terminal position 7 a second conductivity probe 92 is connected in series with the rotors via conductors 94 and 96. The voltage output of each probe is below the level required for conducton by reverse biased diode 56, and also below the level required for energizing stepping solenoids 46 and 60, enabling the probe circuits to operate independently of the switching function of the slave station.

In terminal positions 9 and 11 of stepping switch 50 the positive and negative output terminals of a pressure sensitive depth probe 98 are connected in series with the conductive rotors of stepping switch 50 via conductors 100 and 102. Voltage input to the depth probe is provided from a battery 104 through conductive rotor 68B and terminals 3–11 of level 62B of stepping switch 62. While output information from the depth probe is tapped only in terminal positions 9 and 11, input is provided earlier in the stepping sequence at terminals 3–7 to insure adequate warm-up of the depth probe. The probe itself forms no part of the present invention, and includes a conventional Wheatstone bridge (not shown) in which strain gauges are employed in the resistance arms. The bridge is balanced when no pressure is applied to the probe. The application of pressure produces a force which loads the sensing element, causing it to deflect a few thousandths of an inch. The resulting strain at the gages causes them to change their resistance, producing a bridge imbalance which is proportional to pressure. Consequently an exciting voltage from battery 104 applied to depth probe 98 across the two opposite input terminals of its bridge, produces an output voltage across the coordinate bridge terminals in proportion to the pressure applied.

Calibration of the depth probe 98 is provided by a potentiometer 106 shunted across the input terminals of the probe. A series resistor 108 is joined to the potentiometer tap at one end, and to conductor 102, on the negative side of the probe output circuit, at the other end. The potentiometer output provides a voltage which is combined to the probe output for meter zeroing. Additional calibration is provided by shunting a variable resistor 110 across the negative input and negative output terminals of the depth probe in terminal position 9 of stepping switch 62. Variable resistor 110 is joined at one end to the negative input terminal of depth probe 98, and at the other end to terminal 9 of level 62A of stepping switch 62. The rotor 68A of switch 62 is joined to common lead 64. As the negative output terminal of the depth probe is also ultimately connected to the common lead 64 through terminal position 9 of level 50B and stepping solenoid 60, the variable resistor is effectively shunted across the two negative terminals of the probe. Resistor 110 is set to a value which yields a known depth output signal at terminals 42–44 when the depth probe is calibrated accurately and exposed to atmospheric pressure. The inclusion of the shunting resistor in the probe circuit enables a ready indication of the effects of temperature and voltage variation upon the output reading of the probe, and is a well known expedient. Conductive rotor 68A is connected directly to common lead 64, by-passing solenoid coil 60, to eliminate and avoid the circuit resistance effects of the solenoid coil in the variable calibration resistance circuit. The negative output of the probes through conductive rotor 48B could also be routed directly to the common lead 64 and the positive input through rotor 48A could be connected directly to terminal 42. However, it has been found to be most advantageous to preserve circuit symmetry in the sensitive probe circuits by routing the probe output, as well as the input in a balanced configuration through equal inductances. When a single solenoid stepping switch is employed the symmetry could be preserved through the expedient of dummy impedance in place of the omitted solenoid.

Switching pulses for the activation of the stepping solenoids 46 and 60 are provided by battery 34 in association with conductive rotor 28A of stepping switch 26 as shown in FIG. 1. Power for the activation of conductive rotor 28A between terminals 1–12 of switch 26 is also provided by battery 34. While stepping switch 26 is manually rotatable between latched and unlatched positions, it is sometimes convenient to provide automatic electrical activation. A variable pulse timer is shown in FIG. 1 connected to the positive terminal 37 of battery 34 through an on-off switch 114. The negative terminal of timer 112 is connected to the common terminal 32 of battery 34 via negative lead 122. A stepping solenoid 116 is connected to the pulse output of timer 112 at one end, and to the negative battery terminal 32 at the other. Peeriodic timed stepping of the four levels of stepping switch 26 between latched positions 1–11 occurs through linkage 30 and stepping solenoid 116 in sequence with the timed pulse output from timer 112 which energies the solenoid. Switch 26 may alternately be stepped by opening the timer circuit at switch 114 and activating solenoid 116 by depressing normally open contacts 118. As the synchronous operation of the stepping switches is not foolproof, provision is also made in the slave station for manually shorting stepping solenoid 60 with a normally open switch 120. as shown in FIG. 2, when the slave stepping switches inadvertently become out of step. This allows switch 50 to be stepped independently of switch 62.

Each time switch 26 is stepped from one latched terminal position to another, a correspondingly numbered set of terminals of stepping switch 50 connect an appropriate probe between slave station output terminals 42 and 44 which are, in operation, connected to terminals 22 and 24 of the master station. The negative terminal 24 of master station 20 is connected through common terminal 32 and common conductor 122 to the negative inputs of a bank of electrical output indicating meters 124, 126, 128 and 130. The positive inputs to the meters are ultimately connected through latched contacts 1–11 of level 26A and conductive rotor 28A to the positive terminal 22 of the master station. The bank of electrical meters includes a temperature meter 124, a dissolved oxygen meter 126, a conductivity meter 128, and a depth meter 130. Each meter is connected to an appropriate probe in accord with the synchronous action of the master and slave switching circuits to provide a readout indication of the information signal from each probe.

In terminal position 1 of stepping switch 26 temperature meter 124 is joined to terminal 22 through switch levels 26A and 26C via conductors 121 and 123. For all other terminal positions of switch 26 the temperature meter input is shorted through a variable load resistor 132 via lead 123, rotor 28C, common terminal 32, and common lead 122 to provide a load for the meter 124.

In terminal position 3 of stepping switch 26, dissolved oxygen meter 126 is joined to terminal 22 through switch levels 26A and 26B via lead 125, rotor 28B, a lead 127 and rotor 28A. In terminal position 9 of level 26B a variable resistor 134 is connected in series with the input lead 125 to dissolved oxygen meter 126 and to the output via common terminal 32 and common lead 122 for calibration of the meter.

In terminal positions 5 and 7 of stepping switch 26, conductivity meter 128 is joined to terminal 22 through switch level 26A via a common lead 129. Dual terminal connections to the meter 128 are provided to alternately connect conductivity probes 86 and 92, as shown in FIG. 2, which are sensitive to different ranges of conductivity.

In terminal positions 9 and 11 of stepping switch 26, depth meter 130 is connected to terminal 22 through a normally open switch 136 and switch level 26A via a common conductor 131. At terminal position 9 of level 26A calibration of the depth probe is performed as described above, while the probe reading is taken at terminal position 11. Switch 136 is provided to activate the depth meter 130 only when a reading is taken.

A sensitive indicator 138 is connected to the conductive rotor 28D of level 26D of stepping switch 26 and joined through contact terminals 2–12 of that level and an on-off switch 140 to the positive and negative terminals 37 and 32 of battery 34. The indicator 138 enables monitoring of the condition of battery 34 to insure sufficient voltage for the operation of stepping solenoids 46 and 60, which voltage is required to maintain in-step operation of the master and slave stations.

While the two-conductor remote switching and transmitting system of the present invention has been shown and described with reference to a specific submarine measuring system, modifications of the disclosed exemplary circuit will become obvious and apparent to the skilled worker in the art. For example, a four-layer diode thyristor, or the equivalent, can be substituted for reverse biased diode 56 to provide a similar discriminating function. A single stepping solenoid can be employed in the slave station where circuit balance is unimportant. Bidirectional stepping solenoids and bidirectional stepping switches can be used in place of unidirectional stepping switches and stepping solenoids. Relay banks may be substituted for the stepping switches in the master and slave stations. Switching pulses, generated at the master station, may be used for simultaneously energizing the master and slave stepping solenoids. These pulses can be generated by the variable pulse timer 112 or alternately by manually operating switch 118. The preferred embodiment incorporates a twelve terminal unidirectional stepping switch having alternate latched and unlatched positions to enable manual rotation of the stepping switch 26 where use of the pulse timer or stepping solenoid 116 would be impractical. The probes and meters in the slave and master stations of the present invention are particularly suited to a specific submarine application. Other electrical circuits requiring interconnections between master and slave stations can easily be substituted for the specific circuits described. For example, in addition to other environmental measuring functions, machine monitoring and control, monitoring and control of remote broadcasting and electrical transmission systems, and the like are equally facilitated by the switching and transmitting system of the present invention. As illustrated by the calibration and probe power supply functions of stepping switch 62, control and modification of remote electrical systems can be implemented by the use of additional switching levels in the present invention.

It can thus be seen that a useful two conductor remote switching and transmitting system having application in diverse switching environments has been provided.

Other modifications will become apparent to those skilled in the art in the light of the above teachings and within the scope of the appended claims.

What is claimed is:

1. A two-conductor remote switching and transmitting control system comprising:

a master station including a first plurality of electrical circuits and a power source, a slave station including a second plurality of electrical circuits and a slave switching circuit, an electrical interconnection between said master and slave stations consisting of two conductors, said master station further including master switching means for selectively connecting any one circuit of said first plurality of circuits in series with said two conductors, and for selectively connecting said power source in series with said two conductors, said slave switching circuit including a first plurality of switch contacting means for providing circuit continuity between any one circuit of said second plurality of circuits and said two conductors, and switch driving means electrically connected to said two conductors and powered by said power source for effecting selective continuity of a different circuit of said second plurality of circuits with said two conductors each time said power source is energized in series with said two conductors, said first plurality of switch contacting means and said switch driving means having interconnected electrical continuity with said two conductors, whereby said slave station is responsive to switch driving signals from said power source for each engagement position of said first plurality of switch contacting means.

2. The system described in claim 1, further comprising:

discriminating means in the slave switching circuit for operation as a closed circuit shunt around said first plurality of switch contacting means for switching signals from said power source, and for operating as an open circuit for signals from said first or second pluralities of electrical circuits.

3. The system described in claim 2 in which:

said master switching means includes a multilevel stepping switch, one level of which includes latched terminal positions electrically connected with individual circuits of said first plurality of electrical circuits, alternating with unlatched terminal positions electrically connected to said power source, whereby a switching power pulse is generated each time said stepping switch is advanced between said latched terminal positions.

4. The system described in claim 2 in which:

said slave switching circuit includes a second plurality of switch contacting means activated by said switch driving means for activating and controlling selected circuits of said second plurality of electrical circuits.

5. The system described in claim 3 in which:

said slave switching circuit includes a second plurality of switch contacting means activated by said switch driving means for activating and controlling selected circuits of said second plurality of electrical circuits.

6. The system described in claim 2 in which the discriminating means is a reverse biased diode.

7. The system described in claim 3 in which the discriminating means is a reverse biased diode.

8. The system described in claim 4 in which the discriminating means is a reverse biased diode.

9. The system described in claim 5 in which the discriminating means is a reverse biased diode.

10. The system described in claim 2 in which:

said first plurality of electrical circuits includes a plurality of electrical indicators and, said second plurality of electrical circuits includes a plurality of electrical transducers.

11. The system described in claim 4 in which:

said first plurality of electrical circuits includes a plurality of electrical indicators and, said second plurality of electrical circuits includes a plurality of electrical transducers.

12. The system described in claim 9 in which:

said first plurality of electrical circuits includes a plurality of electrical indicators and, said second plurality of electrical circuits includes a plurality of electrical transducers.

References Cited

UNITED STATES PATENTS

| | | | |
|---|---|---|---|
| 1,849,827 | 3/1932 | Gerald. | |
| 2,038,499 | 4/1936 | Nye | 340—163 |
| 2,410,821 | 11/1946 | Hillman | 340—172 |

ROBERT K. SCHAEFER, Primary Examiner

T. B. JOIKE, Assistant Examiner

U.S. Cl. X.R.

340—147, 151, 163; 346—44